United States Patent
Put et al.

(10) Patent No.: US 11,329,275 B2
(45) Date of Patent: May 10, 2022

(54) COMPOSITE POWDER FOR USE IN AN ANODE OF A LITHIUM ION BATTERY, METHOD FOR MANUFACTURING A COMPOSITE POWDER AND LITHIUM ION BATTERY

(71) Applicant: Umicore, Brussels (BE)

(72) Inventors: Stijn Put, Olmen (BE); Dirk Van Genechten, Koersel (BE); Jean-Sébastien Bridel, Chungnam (KR)

(73) Assignee: UMICORE, Brussels (BE)

( * ) Notice: Subject to any disclaimer, the term of this patent is extended or adjusted under 35 U.S.C. 154(b) by 100 days.

(21) Appl. No.: 15/569,400

(22) PCT Filed: Apr. 26, 2016

(86) PCT No.: PCT/EP2016/059270
§ 371 (c)(1),
(2) Date: Oct. 26, 2017

(87) PCT Pub. No.: WO2016/174023
PCT Pub. Date: Nov. 3, 2016

(65) Prior Publication Data
US 2018/0083271 A1    Mar. 22, 2018

(30) Foreign Application Priority Data

Apr. 28, 2015   (EP) .................................. 15165431
Sep. 14, 2015   (WO) ................. PCT/EP2015/070973

(51) Int. Cl.
| | | |
|---|---|---|
| *H01M 4/36* | (2006.01) | |
| *H01M 4/38* | (2006.01) | |
| *H01M 4/587* | (2010.01) | |
| *H01M 4/583* | (2010.01) | |
| *H01M 10/052* | (2010.01) | |
| *H01M 10/0525* | (2010.01) | |
| *H01M 4/02* | (2006.01) | |

(52) U.S. Cl.
CPC .......... *H01M 4/364* (2013.01); *H01M 4/386* (2013.01); *H01M 4/583* (2013.01); *H01M 4/587* (2013.01); *H01M 10/052* (2013.01); *H01M 10/0525* (2013.01); *H01M 2004/021* (2013.01); *H01M 2004/027* (2013.01)

(58) Field of Classification Search
CPC ...... H01M 4/364; H01M 4/386; H01M 4/583; H01M 2004/027; H01M 10/052; H01M 10/0525; H01M 2004/021; H01M 4/587
USPC ..................................................... 429/231.8
See application file for complete search history.

(56) References Cited

U.S. PATENT DOCUMENTS

| | | |
|---|---|---|
| 2006/0275668 A1 | 12/2006 | Peres |
| 2009/0029256 A1 | 10/2009 | Mah |
| 2011/0253596 A1* | 10/2011 | Khabashesku ........... B01J 23/06 208/135 |
| 2014/0287315 A1* | 9/2014 | Troegel ................. H01M 4/133 429/231.8 |
| 2015/0325848 A1 | 11/2015 | Yamashita et al. |

FOREIGN PATENT DOCUMENTS

| | | | |
|---|---|---|---|
| CN | 103647060 A | | 3/2014 |
| CN | 103682287 | * | 3/2014 |
| CN | 104058404 A | | 9/2014 |
| CN | 104396064 A | | 3/2015 |
| EP | 2797143 A1 | | 10/2014 |
| JP | 2012178269 A | | 9/2012 |
| JP | 2014123571 A | | 7/2014 |
| KR | 20150036132 A | | 4/2015 |

OTHER PUBLICATIONS

The English language machine translation of Lithium ion battery silicon-based composite anode material, preparation method thereof and battery: by Yue Min in CN 103682287 (A)—Mar. 26, 2014 (Year: 2014).*
International Search Report for PCT/EP2016/059270, dated Jun. 6, 2016.
Wen, Z.S., et al., "High Capacity Silicon/Carbon Composite Anode Materials for Lithium Ion Batteries", Electrochemistry Communications, vol. 5, No. 2 (Feb. 28, 2003), pp. 165-168.
Wen, Zhenhai, et al., "Rational design of carbon network cross-linked Si—SiC hollow nanosphere as anode of lithium-ion batteries", Royal Society of Chemistry: Nanoscale, vol. 6, 2014, pp. 342-351.
Sieval, Alexander B., "An Improved Method for the Preparation of Organic Monolayers of 1-Alkenes on Hydrogen-Terminated Silicon Surfaces", Langmuir, 1999, vol. 15, No. 23, pp. 8288-8291.
CNIPA; Office Action for Chinese Patent Application No. 201680024464.3 dated Jul. 23, 2020, 21 pages.
Yu, Keijing, et al., "Shear-thickening behavior of modified silica nanoparticles in polyethylene glycol", Journal of Nanoparticles Research, vol. 14, Mar. 2012, 10 pages.

* cited by examiner

*Primary Examiner* — Jonathan G Jelsma
*Assistant Examiner* — Omar M Kekia
(74) *Attorney, Agent, or Firm* — NK Patent Law

(57) ABSTRACT

Composite powder for use as electrochemically active material in an anode of a lithium ion battery, whereby the particles of the composite powder comprise a carbon-based matrix material and silicon particles embedded in this matrix material, whereby the silicon particles and the matrix material have an interface, characterized in that at this interface there are Si—C chemical bonds present.

15 Claims, No Drawings

COMPOSITE POWDER FOR USE IN AN ANODE OF A LITHIUM ION BATTERY, METHOD FOR MANUFACTURING A COMPOSITE POWDER AND LITHIUM ION BATTERY

This application is a National Stage application of International Application No. PCT/EP2016/059270, filed Apr. 26, 2016. This application also claims priority to European Application No. EP15165431.6, filed Apr. 28, 2015 and International Application No. PCT/EP2015/070973, filed Sep. 14, 2015.

The present invention relates to a composite powder for use in an anode of a lithium ion battery, to a method for manufacturing such a composite powder and to a lithium ion battery comprising such a composite powder.

BACKGROUND

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high energy density combined with a good power performance.

A Li-ion battery typically contains a number of so-called Li-ion cells, which in turn contain a positive (cathode) electrode, a negative (anode) electrode and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing a battery's performance and in particular battery's energy density is the active material in the anode. Therefore, to improve the energy density, newer electrochemically active materials based on e.g. tin, aluminium and silicon were investigated and developed during the last decades, such developments being mostly based on the principle of alloying said active material with Li during Li incorporation therein during use.

The best candidate seems to be silicon as theoretical capacities of 4200 mAh/g or 2200 mAh/cm$^3$ can be obtained and these capacities are far larger than that of graphite (372 mAh/g) but also those of other candidates.

Note that throughout this document silicon is intended to mean the element Si in its zerovalent state. The term Si will be used to indicate the element Si regardless of its oxidation state, zerovalent or oxidised.

However, one drawback of using a silicon-based electrochemically active material in an anode is its large volume expansion during charging, which is as high as 300% when the lithium ions are fully incorporated, e.g. by alloying, in the anode's active material—a process often called lithiation. The large volume expansion of the silicon-based materials during Li incorporation may induce stresses in the silicon, which in turn could lead to a mechanical degradation of the silicon material.

Repeated periodically during charging and discharging of the Li-ion battery, the repetitive mechanical degradation of the silicon electrochemically active material may reduce the life of a battery to an unacceptable level.

In an attempt to alleviate the deleterious effects of the volume change of the silicon, many research studies showed that by reducing the size of the silicon material into submicron or nanosized silicon particles, typically with an average size smaller than 500 nm and preferably smaller than 150 nm, and using these as the electrochemically active material may prove a viable solution.

In order to accommodate the volume change, composite particles are usually used in which the silicon particles are mixed with an auxiliary material, usually a carbon based material, but possibly also a silicon-based alloy or $SiO_x$ with $0<x\leq2$. In the present invention, only composites having carbon as auxiliary material are considered.

Further, a negative effect of silicon is that a thick SEI, a Solid-Electrolyte Interface, may be formed on the anode. An SEI is a complex reaction product of the electrolyte and lithium, and therefore leads to a loss of lithium availability for electrochemical reactions and therefore to a poor cycle performance, which is the capacity loss per charging-discharging cycle. A thick SEI may further increase the electrical resistance of a battery and thereby limit the achievable charging and discharging rates.

In principle the SEI formation is a self-terminating process that stops as soon as a 'passivation layer' has formed on the silicon surface. However, because of the volume expansion of silicon, both silicon and the SEI may be damaged during discharging (lithiation) and recharging (de-lithiation), thereby freeing new silicon surface and leading to a new onset of SEI formation.

In the art, the above lithiation/de-lithiation mechanism is generally quantified by a so-called coulombic efficiency, which is defined as a ratio (in % for a charge-discharge cycle) between the energy removed from a battery during discharge compared with the energy used during charging. Most work on silicon-based anode materials is therefore focused on improving said coulombic efficiency.

Current methods to make such silicon-based composites are based on mixing the individual ingredients (e.g. silicon and carbon or a precursor for the intended auxiliary material) during preparation of the electrode paste formulation, or by a separate composite manufacturing step that is then carried out via dry milling/mixing of silicon and host material (possible followed by a firing step), or via wet milling/mixing of silicon and host material (followed by removal of the liquid medium and a possible firing step).

Despite the advances in the art of negative electrodes and electrochemically active materials contained therein, there is still a need for yet better electrodes that have the ability to further optimize the performance of Li-ion batteries. In particular, for most applications, negative electrodes having improved capacities and coulombic efficiencies are desirable.

Therefore, the invention concerns a composite powder for use as electrochemically active material in an anode of a lithium ion battery, whereby the particles of the composite powder comprise a carbon-based matrix material and silicon particles embedded in this matrix material, whereby the silicon particles and the matrix material have an interface, characterized in that at this interface there are Si—C chemical bonds present.

The composite powder according to the invention has a better cycle performance than traditional powders. Without being bound by theory, the inventors believe that the silicon-carbon chemical bond improves the mechanical strength of the connection between the silicon particles and the carbon matrix material, so that stresses on the interface between the silicon particles and the matrix material, e.g. those associated with expansion and contraction of the silicon during use of the battery, are less likely to lead to a disconnection of the silicon particles from the matrix material. This, in turn, allows for a better transfer of lithium ions from the matrix to the silicon and vice versa. Additionally, less silicon surface is then available for the formation of a SEI.

It is noted that silicon carbide formation may occur in traditional composite powders if silicon embedded in carbon or a carbon precursor is overheated during the manufacture of the traditional composite powder, typically to well over 1000° C., or even 1100° C.

However, this will in practice not lead to a limited, superficial formation of chemical Si—C bonds, as is shown to be beneficial in the present invention, but to a complete conversion of silicon to silicon carbide, leaving no silicon to act as anode active material. Further, in such circumstances a crystalline silicon carbide is formed, which is considered undesirable by the inventors.

Therefore, in a preferred embodiment, said interface is free of crystalline silicon carbide, and in a further preferred embodiment the composite powder is free of crystalline silicon carbide.

In a preferred embodiment at said interface the following relation holds: $3.5*(Si^{4+}+Si^{3+})+1.5*(Si^{2+}+Si^{1+})>2*O^{2-}$, whereby $Si^{4+}$ is the relative prevalence of tetravalent positively charged Si atoms, $Si^{3+}$ is the relative prevalence of trivalent positively charged Si atoms, $Si^{2+}$ is the relative prevalence of bivalent positively charged Si atoms, $Si^{1+}$ is the relative prevalence of monovalent positively charged Si atoms and $O^{2-}$ is the relative prevalence of bivalent negatively charged oxygen atoms, all expressed as atomic fractions. The above relation expresses in other words that the total number of positive charges available on the Si for making a bond, with oxygen or with other elements, is larger than the total number of negative charges available on the oxygen for making a bond with Si or other elements so that there must be Si—C chemical bonds present.

However, no direct determination of the presence of Si—C chemical bonds is possible with any technique as far as the inventors are aware, at least not in the case that region where the Si—C chemical bonds are present are too small or too poorly crystalline to be determined by XRD. Their presence can only be indirectly derived by logic from XPS results.

The relation is a practical approximation of $\Sigma nSi^{n+}>2*O^{2-}$

In order words, if a silicon-carbon interface was clearly defined without a chemical bond, the number of positive charges from the silicon should be equal to the number of negative charges from the oxygen. If the oxygen negative charges are lower than the silicon positive charges, the most probable explanation is that a complex interface with Si—C chemical bonds exists.

As only the ratio of the various charged species is relevant, the absolute concentration does not need to be known. Therefore it is sufficient if only the relative prevalence is known.

By means of XPS a strength signal of bond energies can be determined. These bond energies can be attributed to one or more specific chemical bonds being formed by one or more specific charged atoms, so that the relative prevalence of charged atoms having can be determined.

The $Si^{4+}$, $Si^{3+}$, $Si^{2+}$, $Si^{1+}$ and $O^{2-}$ are as determined by X-ray photoelectron spectroscopy measurements, whereby the sum of $Si^{4+}$ and $Si^{3+}$ and the sum of $Si^{2+}$ and $Si^{1+}$ are determined, using as an X-ray source was an Al Kα monochromatic beam, using a pass energy of 25 eV, and providing data treatment of the obtained data as follows: Si 2p curve fitting a nonlinear least-squares algorithm, assuming Gaussian peak shapes for each component and using the signal at 101 eV to represent the prevalence of $Si^{2+}$ atoms and $Si^{1+}$ atoms and the signal at 103 eV to represent the prevalence of $Si^{4+}$ atoms and $Si^{3+}$ atoms.

In a preferred embodiment the following relation holds: $3.5*(Si^{4+}+Si^{3+})+1.5*(Si^{2+}+Si^{1+})>2*O^2$, indicating a large excess of chemical bonds involving Si compared to the bonds involving oxygen.

In a preferred embodiment $Si^{4+}$, $Si^{3+}$, $Si^{2+}$, $Si^{1+}$ and $O^{2-}$ are determined from X-ray photoelectron spectroscopy, further called XPS, measurements, whereby the sum of $Si^{4+}$ and $Si^{3+}$ and the sum of $Si^{2+}$ and $Si^{1+}$ are determined.

In a preferred embodiment the silicon particles are dispersed in the matrix material whereby either a part of the silicon particles are present in the form of agglomerates of silicon particles whereby at least 98% of these agglomerates have a maximum size of 3 µm or less, preferably 2 µm or less, more preferably 1 µm or less, or the silicon particles are not at all agglomerated into agglomerates.

Preferably the matrix material is a continuous matrix.

In a preferred embodiment the composite powder has an average particle diameter $d_{50}$ of between 1 and 20 microns.

In a preferred embodiment the composite powder has a BET value of less than 10 m²/g, preferably of less than 5 m²/g and more preferably of less than 2 m²/g.

In a preferred embodiment the particles of the composite powder have a porosity of less than 20 volume % and preferably less than 10 volume %.

In a preferred embodiment the silicon particles are either free silicon particles that are not or not completely embedded in the matrix or are fully embedded silicon particles that are completely surrounded by the matrix material, whereby the percentage of free silicon particles is lower than or equal to 4 weight %, preferably lower than 3 weight %, and more preferably lower than 2 weight %, and most preferably lower than 1 weight % of the total amount of Si in metallic or oxidised state in the composite powder Hereby the percentage of free silicon particles is the percentage as determined by placing a sample of the composite powder in an alkaline solution for a specified time, determining the volume of hydrogen that has evolved after the specified time, calculating the amount of silicon needed for evolving this amount of hydrogen based on a production of two moles of hydrogen for every mole of silicon reacted and dividing this by the total amount of Si in metallic or oxidised state present in the sample.

For instance, this can be done by the following procedure: 0.1 g of a composite powder to be tested, having a known total Si content, is placed in a solution of 1.2 g/l KOH in water, at 45° C. A gas burette can be used to collect and measure the volume of gas evolved over a 48 hr period.

The volume of gas thus calculated is converted to a mass of reacted silicon based on the ideal gas law and the knowledge that the reaction of silicon with KOH will proceed according to one or both of the following reactions, which both give an equivalence of 2 moles of hydrogen per mole of silicon:

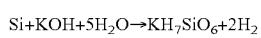

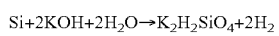

The percentage of free silicon-based domains is then defined as the ratio of the amount of reacted silicon and the total amount of Si in the sample.

Preferably the silicon particles have a weight based size distribution with a $d_{50}$ of 200 nm or less and a $d_{90}$ of 1000 nm or less.

In a preferred embodiment the composite powder contains less than 3 weight % of oxygen.

In a preferred embodiment the composite powder contains between 2 weight % and 25 weight % of Si, and preferably between 8 weight % and 15 weight % of Si.

Preferably the matrix material is pitch or thermally decomposed pitch.

In a preferred embodiment the composite powder also contains graphite, whereby the graphite is not embedded in the matrix material.

In a preferred embodiment the composite powder also contains graphite, whereby the silicon particles are not embedded in the graphite.

Preferably the ratio between the average size of the particles of the composite powder and the $d_{50}$ of the silicon particles is 10 or more, preferably 20 or more and most preferably 40 or more.

The invention further concerns a method of manufacturing a composite powder, preferably a composite powder as described above according the invention, comprising the following steps A: Providing silicon particles B: Providing a surface free of any oxides on the silicon particles and contacting this surface with a carbon-containing compound in order to obtain a chemical reaction between the silicon on the surface of the silicon particles and the carbon containing compound C: mixing the silicon particles with a carbon precursor which can be thermally decomposed to carbon.

D: Thermally treating the product from step C effecting a thermal decomposition of the carbon precursor.

Compared to the traditional methods of preparing composite powders comprising the electrochemically active material silicon, which lack step B, a powder with superior electrochemically performance is obtained by this method. The inventor believe that this is due to step B, which will form a mechanically strong interface between the silicon and the carbon containing compound that is better able, compared to traditional interfaces to withstand mechanical stresses during use of a battery in which the composite powder forms an anode constituent.

Alternatively, the invention may be defined by the following clauses:

1.—Composite powder for use in an anode of a lithium ion battery, whereby the particles of the composite powder comprise a carbon-based matrix material and silicon particles embedded in this matrix material, whereby the silicon particles and the matrix material have an interface, characterized in that at this interface the following relation holds: $3.5*(Si^{4+}+Si^{3+})+1.5*(Si^{2+}+Si^{1+})>2*O^{2-}$, whereby $Si^{1+}$ is the relative prevalence of tetravalent positively charged Si atoms, $Si^{1+}$ is the relative prevalence of trivalent positively charged Si atoms, $Si^{2+}$ is the relative prevalence of bivalent positively charged Si atoms, $Si^{1+}$ is the relative prevalence of monovalent positively charged Si atoms and $O^{2-}$ is the relative prevalence of bivalent negatively charged oxygen atoms, all expressed as atomic fractions.

2.—Composite powder according to clause 1, characterized in that $Si^{4+}$, $Si^{3+}$, $Si^{2+}$, $Si^{1+}$ and $O^{2-}$ are as determined by X-ray photoelectron spectroscopy measurements, whereby the sum of $Si^{4+}$ and $Si^{3+}$ and the sum of $Si^{2+}$ and $Si^{1+}$ are determined.

3.—Composite powder according to clause 1, characterized in that $Si^{4+}$, $Si^{3+}$, $Si^{2+}$, $Si^{1+}$ and $O^{2-}$ are as determined by X-ray photoelectron spectroscopy measurements, whereby the sum of $Si^{4+}$ and $Si^{3+}$ and the sum of $Si^{2+}$ and $Si^{1+}$ are determined, using as an X-ray source was an Al Kα monochromatic beam, using a pass energy of 25 eV, and providing data treatment of the obtained data as follows: Si 2p curve fitting a nonlinear least-squares algorithm, assuming Gaussian peak shapes for each component and using the signal at 101 eV to represent the prevalence of $Si^{2+}$ atoms and $Si^{1+}$ atoms and the signal at 103 eV to represent the prevalence of $Si^{4+}$ atoms and $Si^{3+}$ atoms.

4.—Composite powder according to any of the previous clauses, characterized in that said silicon particles have an average particle size of 500 nm or less.

5.—Composite powder according to any of the previous clauses, characterized in that the carbon matrix material is pitch or thermally decomposed pitch.

6.—Composite powder according to any of the previous clauses, characterized in that the following relation holds: $3.5*(Si^{4+}+Si^{3+})+1.5*(Si^{2+}+Si^{1+})>2*O^{2-}$.

7.—Composite powder according to any of the previous clauses, characterized in that the composite powder is free of crystalline silicon carbide.

8.—Composite powder according to any of the previous clauses, characterized in that the composite powder is free of crystalline SiC-phase observable by X-ray diffractometry.

The invention will be further explained by the following examples and counterexample.

ANALYTICAL METHODS USED

Determination of Oxygen Content

The oxygen contents of the powders in the examples and the counterexamples were determined by the following method, using a Leco TC600 oxygen-nitrogen analyzer.

A sample of the powder was put in a closed tin capsule that was put itself in a nickel basket. The basket was put in a graphite crucible and heated under helium as carrier gas to above 2000° C.

The sample thereby melts and oxygen reacts with the graphite from the crucible to CO or $CO_2$ gas. These gases are guided into an infrared measuring cell. The observed signal is recalculated to an oxygen content.

Determination of Electrochemical Performance

A slurry is prepared using 80 wt % of the composite powder to be tested, 10 wt % of a Na-CMC binder (molecular weight<200000) and 10 wt % of a conductive additive (Super C65, Timcal). In a first step, a 2.4% Na-CMC solution is prepared and dissolved overnight. Then, the conductive carbon is added to this solution and stirred for 20 minutes using a high-shear mixer. Once a good dispersion of the conductive carbon is obtained, the material to be tested is added and the slurry is stirred again using a high-shear mixer during 30 minutes.

Electrodes were prepared by coating the resulting slurry on a copper foil (17 μm) cleaned with ethanol, using 125 μm wet thickness of the slurry, and then dried at 70° C. for 2 hours.

Round electrodes were punched and dried at 150° C. during 3 hours in a small vacuum oven. The electrodes were electrochemically tested versus metallic lithium using coin cells prepared in a glovebox (dry Argon atmosphere). The electrolyte used was $LiPF_6$ 1 M in a mix of EC/DEC (50/50 wt %)+10% FEC+2% VC (Semichem). The coin cells were tested in a constant current mode between 10 mV and 1.5 V at a C-rate of C/5 (meaning a full charge of discharge of active material in 5 hours).

The first irreversibility and the coulombic efficiency of repeated charging and discharging cycles were determined. The average coulombic efficiency of the 5 $h^{th}$-20$^{th}$ cycle is reported.

The skilled person will be aware that a small difference in coulombic efficiency per cycle, will have, over the hundreds or thousands of charging-discharging cycles a battery is expected to last, a significant cumulative effect.

XRD Measurements

XRD measurements are performed on a Panalytical 'X Pert Pro system with CuKα1 radiation, λ=0.154056 nm, with a step size of 0.017° 2θ, scan rate of 34 minutes (2064 seconds) and measuring from 5° till 90° 2theta on a flattened surface of about 2 cc powder material at least, using the ICDD database, PDF-4+, for the identification of present compounds.

Determination of Relative Prevalence of Charged Atoms.

XPS spectra were recorded on a SSI S-Probe XPS spectrometer. The X-ray source was an Al Kα monochromatic beam (1486.6 eV). Data were collected at room temperature and the operating pressure in the analysis chamber was kept below 8.10-9 mbar. Pass energy was fixed at 25 eV, providing an energy resolution of ~730 meV. Data treatment was performed with CasaXPS software. After the base line (Shirley) was subtracted, the Si 2p curve fitting was performed using the nonlinear least-squares algorithms, assuming Gaussian peak shapes for each component. All spectra were calibrated taking C (sp2) as a reference binding energy of 284.5 eV.

The different chemical bonds between silicon and carbon (e.g. Si—C/Si—Si—C, Si—O—C—Si, $Si_yO_xC_z$) cannot be clearly differentiated by the XPS analysis. The signal induced by these bonds occurs at similar energies and the resolution of XPS tools is not high enough to make the difference.

Nevertheless, the XPS spectrums can be deconvoluted and used to calculate the atomic proportions of the different atoms.

Whereas the bond energies of bonds of $Si^{4+}$ atoms and of $Si^{3+}$ atoms are difficult to differentiate between on an XPS result, these can be relatively easily distinguished from bond energies of bonds of $Si^{2+}$ and $Si^{1+}$ atoms, which in turn are difficult to differentiate between. For this reason the signal of $Si^{4+}$ atoms and $Si^{3+}$ atoms were grouped and only their total was determined and the $Si^{1+}$ atoms and $Si^{1+}$ atoms were grouped and only their total was determined.

The signal at 101 eV was taken to represent the prevalence of $Si^{2+}$ atoms and $Si^{1+}$ atoms.

The signal at 103 eV was taken to represent the prevalence of $Si^{4+}$ atoms and $Si^{3+}$ atoms.

The signal at 99 eV was taken to represent the prevalence of $Si^0$.

The signal at 532 eV was taken to represent the prevalence of $O^{2-}$ atoms.

The signal at 285 eV was taken to represent the prevalence of Carbon atoms.

In order to be able to measure the silicon-carbon interface inside a particle of the composite powder, the composite powder was gently milled with a mortar in a protective atmosphere.

Hereby a fresh surface is created, containing silicon particles covered with a thin layer of interfacial material and carbon.

The XPS probe measured a few square micrometer of surface, to a depth of a few nm, thereby including a significant proportion of interfacial material in the measurement. This was confirmed by the fact that significant $Si^0$ as well as C signals were observed.

Particle Size Distributions

Particle size distributions (PSD) were determined by the following method.

0.5 g of Si powder 99.50 g of demineralised water were mixed and dispersed by means of an ultrasound probe for 2 min @ 225 W.

The size distributions were determined on a Malvern Mastersizer 2000, using ultrasound during the measurement, using a refractive index for Si of 3.5 and an absorption coefficient of 0.1 and ensuring that the detection threshold was between 5 and 15%.

Example 1

A submicron-sized silicon powder was obtained by applying a 60 kW radio frequency (RF) inductively coupled plasma (ICP), using argon as plasma gas, to which a micron-sized silicon powder precursor was injected at a rate of 220 g/h, resulting in a prevalent (i.e. in the reaction zone) temperature above 2000 K. In this first process step the precursor became totally vaporized followed. In a second process step an argon flow was used as quench gas immediately downstream of the reaction zone in order to lower the temperature of the gas below 1600 K, causing a nucleation into metallic submicron silicon powder. Finally, a passivation step was performed at a temperature of 100° C. during 5 minutes by adding 100 l/h of a $N_2/O_2$ mixture containing 0.15 mole % oxygen. The gas flow rate for both the plasma and quench gas was adjusted to obtain submicron silicon powder with an average particle diameter $d_{50}$ of 80 nm and a $d_{90}$ of 521 nm. In the present case 2.5 $Nm^3$/h Ar was used for the plasma and 10 $Nm^3$/h Ar was used as quench gas.

In a second step 70 g of this powder was kept in a polypropylene autoclave for 1 hour in 4 L of concentrated HF at a temperature of 100° C. to dissolve the $SiO_2$ present on the surface. The autoclave was flushed with cyclohexane, without any intermediate introduction of oxygen-containing compounds. It is expected that a physico-chemical reaction between the clean, very reactive surface of the particles and the cyclohexane occurs.

Analogous reactions will occur not only with cyclohexane but also with other hydrogen and carbon containing compounds, whereby preferably these compounds are free from oxygen to avoid that this oxygen reacts with the reactive sites on the silicon surface, thereby limiting or blocking the desired reaction of carbon with these reactive sites.

Preferably these hydrogen and carbon containing compounds are liquid or gaseous.

The powder was filtered and dried under vacuum.

16 g of the thus-obtained silicon powder was dry-mixed with 32 g of petroleum based pitch powder. This was heated to 450° C. under $N_2$, so that the pitch melted, and kept at this temperature for 60 minutes.

The mixture of submicron silicon in pitch thus obtained was cooled under $N_2$ to room temperature and, once solidified, pulverized and sieved on a 45 μm sieve.

Artificial graphite with an average particle of 15 μm was added to the silicon powder/pitch blend by dry-mixing, to obtain a silicon powder/pitch/graphite mixture with a weight ratio of 1.0:2.0:7.6, respectively.

10 g of the obtained mixture was fired in a quartz boat in a tube furnace continuously flushed with argon and heated to 1000° C. at a heating rate of 3° C./min. The sample was kept at 1000° C. for 2 hours. The heating was turned off and the sample was allowed to cool to room temperature under argon atmosphere. The sample was removed from the quartz recipient, milled for 15 min in a coffee mill, and sieved to obtain a composite powder.

The composite powder was evaluated by XPS, whereby the relative prevalence of various charged atoms on the interface between Si and C was determined. Further, an XRD measurement was taken.

Also, the electrochemical properties of the composite powder were evaluated. The results are shown in table 1.

The oxygen content of this composite powder was measured and was 0.6 wt %.

Alternative to the abovementioned second step, other methods of generating a clean surface are available. It is for instance possible to mill the silicon powder in a ball mill in a hydrocarbon free of oxygen atoms such as an alkane with four or more C atoms, for instance heptane or cyclohexane or an aromatic, for instance pyridine, benzene or xylene, generating fresh surface by impact of the balls, or to treat the silicon powder with a strong reducing agent to reduce any silicon oxides on the surface, before treating it with such a hydrocarbon.

Examples 2 and 3

Silicon powders were produced similar to example 1, but with different flowrates of the plasma gas and the quench gas, producing a silicon powder with a diameter $d_{50}$ of circa 52 nm and a $d_{90}$ of 490 nm (example 3) and with a diameter $d_{50}$ of circa 35 nm and a $d_{90}$ of 319 nm (example 2).

These silicon powders underwent the same further treatment and analysis as the silicon powder in example 1 to obtain composite powders.

The oxygen content of these composite powders were measured and were 1.0% for example 2 and 0.9% for example 3.

Counterexample 1

The procedure of example 1 was used, except for the absence of the second step.

The oxygen content of this composite powder was measured and was 1.4 wt %.

The following experimental results were obtained:

The invention claimed is:

1. A composite powder for use in an anode of a lithium ion battery, the composite powder comprising a carbon-based matrix material and silicon particles embedded in the matrix material, wherein an interface is present between the matrix material and the silicon particles, wherein Si—C chemical bonds are present at the interface and said interface is free of crystalline silicon carbide.

2. The composite powder of claim 1, wherein the composite powder is free of crystalline silicon carbide.

3. The composite powder of claim 1, wherein said silicon particles have an average particle size of 500 nm or less.

4. The composite powder of claim 1, wherein the carbon matrix material comprises pitch or thermally decomposed pitch.

5. The composite powder of claim 1, wherein at the interface the following relation holds: $3.5*(Si^{4+}+Si^{3+})+1.5*(Si^{2+}+Si^{1+})>2*O^{2-}$, wherein $Si^{4+}$ is the relative prevalence of tetravalent positively charged Si atoms, $Si^{3+}$ is the relative prevalence of trivalent positively charged Si atoms, $Si^{2+}$ is the relative prevalence of bivalent positively charged Si atoms, $Si^{1+}$ is the relative prevalence of monovalent positively charged Si atoms and $O^{2-}$ is the relative prevalence of bivalent negatively charged oxygen atoms, all expressed as atomic fractions.

6. The composite powder of claim 5, wherein $Si^{4+}$, $Si^{3+}$, $Si^{2+}$, $Si^{1+}$ and $O^{2-}$ are as determined by X-ray photoelectron spectroscopy measurements, wherein the sum of $Si^{4+}$ and $Si^{3+}$ and the sum of $Si^{2+}$ and $Si^{1+}$ are determined.

7. A lithium ion battery having an anode comprising the composite powder of claim 1.

8. A method of manufacturing a composite powder, the method comprising:
 a) providing silicon particles, wherein the silicon particles have surfaces free of any oxides;
 b) contacting the surfaces of the silicon particles with an oxygen-free carbon-containing compound at a temperature of less than 300° C. in order to obtain a chemical reaction between silicon on the surfaces of the silicon particles and the carbon-containing compound;

TABLE 1

| | Xps relative prevalence (%) | | | | | Battery performance | |
|---|---|---|---|---|---|---|---|
| Product: | C | $O^{2-}$ | $Si^0$ | $Si^{3+/4+}$ | $Si^{1+/2+}$ | $3.5*(Si^{4+}+Si^{3+})+1.5*(Si^{2+}+Si^{1+})$ | First irreversibility (%) | Coulombic efficiency (average $5^{th}$-$20^{th}$ cycle) |
| Example 1 | 85 | 5.5 | 0.4 | 2.4 | 6.7 | 18.5 | 14.1 | 99.6 |
| Example 2 | 91 | 3.5 | 0.3 | 0.8 | 3.4 | 7.9 | 13.3 | 99.7 |
| Example 3 | 89.2 | 4.1 | 0.4 | 1.2 | 5.1 | 11.9 | 12.2 | 99.7 |
| Counter-example 1 | 81 | 10.9 | 0.2 | 2.9 | 5.0 | 17.7 | 12.8 | 99.4 |

In none of the products, SiC could be observed by XRD.

The particle size distribution of the composites powders were determined and showed that they all had a $d_{50}$ of between 9 and 12 μm It is clear that the absence of the second step has a direct negative impact on the battery performance. The main interesting parameter is the coulombic efficiency. The specific interface of the composite powder according to the invention allows an improvement in the coulombic efficiency by circa 0.2%, which has a direct impact on the life of a battery.

c) mixing the silicon particles with a carbon precursor, which can be thermally decomposed to carbon; and
 d) thermally treating the mixture from step C thereby effecting a thermal decomposition of the carbon precursor.

9. The method of claim 8, wherein step D is performed at a temperature of more than 400° C. and not exceeding 1075° C.

10. The method of claim 9, wherein step D is performed at a temperature not exceeding 1020° C.

11. The method of claim 8, wherein the silicon particles have an average particle size of 500 nm or less.

12. The method of claim 8, wherein the carbon-containing compound of step B comprises an oxygen-free aromatic compound or an oxygen-free alkane with more than four carbon atoms.

13. The method of claim 8, wherein the carbon precursor of step C is pitch.

14. The method of claim 8, wherein it is a method for preparing the composite powder of claim 1.

15. A lithium ion battery having an anode comprising a composite powder formed in the method of claim 8.

\* \* \* \* \*